United States Patent [19]

Gunther

[11] 4,130,696

[45] Dec. 19, 1978

[54] CONDUCTIVE DILUENT FOR PRESSED NICKEL ELECTRODES

[75] Inventor: Ronald G. Gunther, Mystic, Conn.

[73] Assignee: Yardney Electric Corporation, Pawcatuck, Conn.

[21] Appl. No.: 721,910

[22] Filed: Sep. 9, 1976

[51] Int. Cl.$^2$ ............................................. H01M 4/32
[52] U.S. Cl. .................................. 429/223; 429/232; 429/217
[58] Field of Search ............... 429/223, 209, 212, 217, 429/218, 232, 241, 242

[56] References Cited

U.S. PATENT DOCUMENTS

| | | | |
|---|---|---|---|
| 948,558 | 2/1910 | Edison | 429/223 X |
| 2,727,080 | 12/1955 | Moulton | 429/223 X |
| 2,738,375 | 3/1956 | Schlotter | 429/217 |
| 2,828,351 | 3/1958 | Rade | 429/217 X |
| 3,066,178 | 11/1962 | Winkler | 429/223 X |
| 3,230,113 | 1/1966 | Herold | 429/223 X |
| 3,551,205 | 12/1970 | Fraioli et al. | 429/232 X |

*Primary Examiner*—Anthony Skapars
*Attorney, Agent, or Firm*—Donald E. Nist

[57] ABSTRACT

The conductive diluent is a combination of powdered carbon (preferably graphite) and nickel flakes. It is admixed with the active electrode material and a binder in the pressed nickel electrode so that the diluent is substantially homogeneously mixed with the active electrode material and is mixed in proportions (by weight) sufficient to provide between about 4% to about 10% of nickel flake and between about 5% to about 10% of powdered carbon within a preferred total conductive diluent range of 10-15%, with the remainder of the nickel electrode admixture essentially comprising active electrode material with a small amount of binder.

13 Claims, 1 Drawing Figure

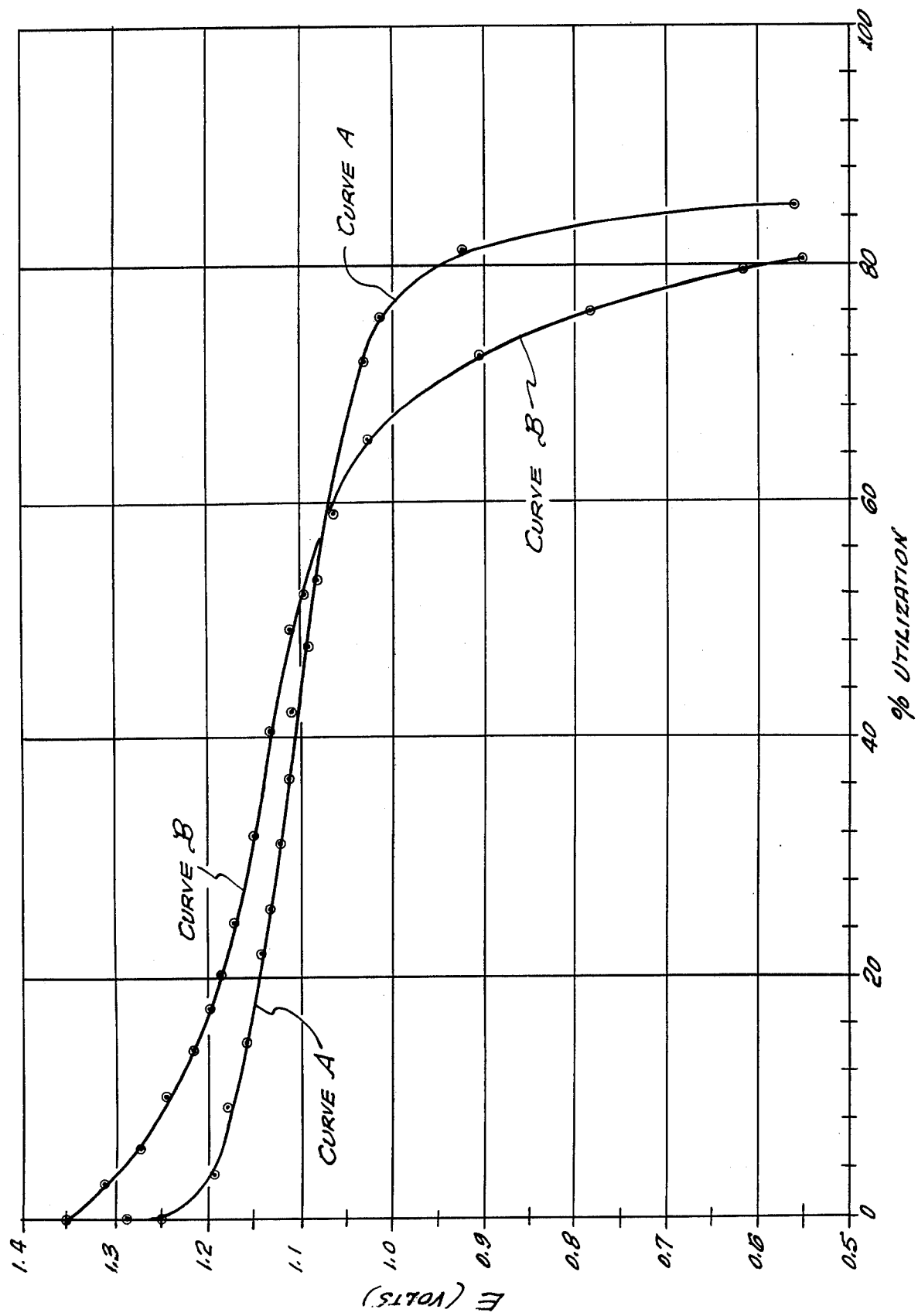

CONDUCTIVE DILUENT FOR PRESSED NICKEL ELECTRODES

BACKGROUND OF THE INVENTION

This invention relates to high energy density batteries which utilize nickel electrodes as the positive electrode and more particularly relates to pressed nickel electrodes for use in such batteries.

In nickel electrodes, the active electrode material may be nickel hydroxide or a berthollide nickel oxide represented by the formula $NiO_x$. The electrical conductivity of such active electrode materials is sufficiently low to require that they be used in combination with conductive diluents or equivalent structure. Suitable conductive diluents include powdered carbon (including its graphite form) and nickel in flake or powder form.

In sintered porous electrodes, the sintered nickel plaque provides the desired internal conductivity (rather than a diluent). However, due to the cost of introducing the active electrode material into the plaque, efforts have been directed to two other nickel electrode structures, namely, pocket and pressed nickel electrodes. In pocket electrodes, it is customary to alternate layers of the active electrode material with layers of nickel flake (as described in U.S. Pat. No. 857,929), whereas in pressed nickel electrodes, or graphite powder is mixed with the active electrode material (as described in U.S. Pat. No. 3,023,259).

Although batteries employing presently available pressed nickel electrodes function satisfactorily, the amount of conductive diluent employed in these cells is such that the diluent constitutes a substantial percent by weight of the weight of the active electrode material. Because the volume of the nickel electrode in any given application is limited, the relatively high percentage of conductive diluent means that the performance of such batteries is significantly limited since, of course, the conductive diluent is not an active electrode material and does not directly contribute to battery output. Thus, it will be understood that it would be advantageous to be able to substantially reduce the volume of conductive diluent in pressed nickel electrodes while equaling or improving upon the discharge capabilities of presently available batteries utilizing such electrodes.

Upon repeated cyling, the carbonaceous conductive diluent material is partially oxidized leading to carbonate formation in the alkaline electrolyte. Since cell performance is adversely affected by carbonate in the electrolyte, it is desirable to minimize the carbon content in the electrode.

SUMMARY OF THE INVENTION

The improved conductive diluent described herein comprises a combination of a powdered carbon, preferably graphite, and nickel flake. This combined conductive diluent is utilized by substantially homogenously mixing it with the active electrode material and a small amount of binder in a pressed nickel electrode. The conductive diluent components and active electrode material are combined in an electrode material admixture to provide the following weight percentages as a percent of the total amount of active electrode material, conductive diluent and binder: nickel flake — about 4% to about 10% and powdered graphite — about 5% to about 10%, with the total amount of conductive diluent preferably being between about 10–15%; and with the remainder of the admixture being predominately active electrode material.

Use of the aforedescribed conductive diluent permits a substantial reduction of both the amount and volume of conductive diluent as compared with prior art pressed nickel electrodes. This means that greater amounts of active electrode material will be utilized in a given pressed nickel electrode volume. Additionally, the use of lower amounts of conductive diluent enables one to produce a pressed nickel electrode capable of reaching and maintaining a higher percent of theoretical capacity than would otherwise be attainable, while still maintaining the desired level of internal electrode conductivity.

DESCRIPTION OF THE DRAWING

The FIGURE is a graph of electrochemical cell potential (E), as measured against a cadmium reference electrode, vs. % utilization (i.e., % of theoretical capacity) for a cell utilizing a pressed nickel electrode incorporating an active electrode material mixture representative of the herein-described invention.

DESCRIPTION OF THE PREFERRED EMBODIMENT

The herein-described invention is embodied in an improved conductive diluent for use in pressed nickel electrodes which, in turn, are utilized in high energy density nickel batteries such as nickel/iron, nickel/zinc, nickel/hydrogen and nickel/cadmium batteries. The pressed nickel electrodes utilized in these batteries are commonly formed by pressing a mixture of active electrode material, binder, conductive diluent and any other constituents into the pores of an apertured current collector at pressures sufficient to provide a nickel electrode having sufficient mechanical and physical integrity to be employed in battery applications.

The current collectors which may be utilized in pressed nickel electrodes include, for example, perforated nickel sheets, woven wire mesh, and expanded nickel metal. The binder employed to aid in holding the active electrode material and other constituents together is preferably polytetrafluoroethylene although other binders may be used. The active electrode material may be nickel hydroxide or the berthollide $NiO_x$ where $x$ is not an integer. A particularly useful form of the latter is characterized in that it contains about 55% by weight of nickel and has an x value between about 1.65 and 1.8. The charge acceptance of electrodes containing the $NiO_x$ may be improved by including a cobalt-containing compound such as cobalt hydroxide or the berthollide $CoO_x$ which is analagous to $NiO_x$.

The various constituents utilized in pressed nickel electrodes which have thus far been described are well known in the prior art and do not in themselves form a part of the herein-described invention. As noted above, the improvement in pressed nickel electrodes described herein, comprises a conductive diluent admixture which consists of powdered carbon in combination with nickel flake. As used herein and in the claims, the term "carbon" refers both to amorphous carbon and to carbon in its crystalline or graphite form. Because of its superior electrical conductivity, graphite is the preferred form of carbon utilized in the herein-described conductive diluent.

The nickel in the conductive diluent described herein is used in its flake form rather than as a powder. Nickel in its powdered form does not provide the desirable results which are realized when using nickel flake. The term "flake" is used in its dictionary meaning to refer to nickel in a form which is essentially planar, i.e., wherein the material is characterized by particles being substantially dimensionally larger or wider in one plane than in another. The size of the nickel flake utilized herein may vary considerably. For example, flakes as large as 1.1–1.5 mm$^2$ by 0.9–1.3$\mu$m thick or as small as those having an area defined by the sieve sizes +20$\mu$m, −44$\mu$m and having a thickness of approximately 0.5$\mu$m, as well as mixtures of large and small flakes, can be used. However, it is preferably to employ the larger size nickel flakes since their usage results in better performance primarily because lesser of the larger flake is required as compared with the smaller flake to provide the same performance.

The nickel flake is used in amounts between about 4% by weight and about 10% by weight. As used herein and in the claims, the term "percent (or '1%') by weight" means percent by weight of the total weight of active electrode material, conductive diluent and binder, but excluding the grid used as a current collector. Below about 4% by weight, there is insufficient nickel present to provide the requisite internal conductivity at the low levels of graphite employed herein. Above about 10% by weight of nickel flake, the minor improvement (up to a point) in internal conductivity of the pressed nickel electrode is not warranted by the additional cost of the additional nickel flake.

The powdered carbon, and particularly the graphite, is employed in amounts between about 5% and about 10% by weight. At amounts less than about 5%, insufficient internal conductivity exists utilizing the limited amounts of nickel flake employed herein, whereas above about 10%, the slight improvement in internal conductivity is not warranted by the increased cost of the conductive diluent.

When using large nickel flake, it is preferred to use amounts of nickel flake and powdered graphite such that the total amount of conductive diluent lies between about 10% and about 15% by weight. Within that range, when using large nickel flake (as described hereinbefore), it is preferred to employ between about 5% and about 7% by weight of each of the nickel flake and powdered graphite. Most preferably, the graphite is present in amounts equal to or greater than the large-sized nickel flake.

When small nickel flake (as described hereinbefore) is utilized, it is preferred to use about 7% to about 10% by weight of nickel flake and about 5% to about 8% by weight of powdered graphite with the total amount of conductive diluent being between about 12% and about 15% by weight.

Although slightly improved results can be obtained using higher amounts of conductive diluent than the preferred amounts, larger amounts of conducting diluent are normally not warranted because of the increased cost of the latter. At levels of conductive diluent higher than those permitted in the herein-described invention, the performance characteristics of pressed nickel electrodes will be adversely affected because of the decreasing amount of active electrode material capable of being utilized as the amount of conductive diluent increases in any given electrode volume.

The amount of binder is that amount which is required to provide a cohesive, unitary electrode and will generally vary between about 1.5% and about 10% by weight, although amounts between about 2% and about 3% by weight are preferred.

The amount of active electrode material employed will be that amount which is necessary to make up 100% by weight as that term has been defined hereinbefore. Preferably, the amount of active electrode material is generally as large an amount as possible consistent with the mechanical integrity of the electrode in order to maximize electrode performance per unit weight of electrode material. Thus, the amount of active electrode material will usually vary between about 80% and about 88% by weight.

This invention will be further described by the following Examples in which, unless otherwise indicated, "%", means percent by weight.

EXAMPLE 1

A pressed nickel electrode was made by first formulating an electrode mixture having the following composition: 76% NiO$_x$, 8% CoO$_x$, 7% "large size" nickel flake, 7% graphite and 2% polytetrafluoroethylene. That electrode mixture was applied to an expanded nickel current collector at an applied pressure of about 12,000 psi to produce the pressed nickel electrode. Prior to incorporating the NiO$_x$ into the electrode mixture, it was heated at a temperature of 150° C. for 2 hours.

The pressed nickel electrode was put into a "dummy" cell with a nickel plaque counter-electrode, a cadmium reference electrode and an aqueous electrolyte comprising 31% by weight (of the electrolyte) sodium hydroxide and 1% by weight of lithium hydroxide. Initially, this cell was discharged of its residual capacity resulting from the chemical oxidation of the nickel and cobalt. Then the cell was charged electrochemically at a current level of 0.1 amp. to 200% of theoretical discharge capacity. Thereafter, the charged cell was discharged (at 0.1 amp. and 3.8 ma/cm$^2$) to a cutoff of 0.55 colts (measured against the cadmium reference). The aforementioned cutoff voltage was selected for the "dummy" cell because it is approximately equal to a 1 volt cutoff for a nickel/zinc cell. A capacity of 0.38 amp. hr. was realized from the cell to the cutoff voltage of 0.55 amp.

The data generated from the foregoing discharge are shown in the Figure as Curve A. The percent utilization (i.e., percent theoretical capacity) values shown in the Figure are based upon the active nickel-and cobalt-containing components of the pressed nickel electrode. As will be noted from the Figure, a utilization of approximately 85% was obtained.

EXAMPLE 2

A pressed nickel electrode was made up as described in Example 1 except that the following electrode mixture was used: 79% NiO$_x$; 9% CoO$_x$; 5% "large size" nickel flake; 5% graphite and 2% polytetrafluoroethylene.

The described pressed nickel electrode was placed in a "dummy" cell as in Example 1 and was subjected to the same discharge/charge regime as described in Example 1, except that during the charge phase, a current of 0.05 amp. was utilized and charging was continued to 180% of the theoretical discharge capacity. A capacity of 0.46 amp. hours was realized to the cutoff voltage of 0.55 amp.

The data generated from the foregoing discharge are shown in the Figure as Curve B. As shown therein, utilization of approximately 80% was obtained.

EXAMPLE 3

A pressed nickel electrode was made up as described in Example 1 except that the conductive diluent comprised 5% "large" nickel flake and 7% graphite and except that 78% $NiO_x$ was used. When placed in the same cell and subjected to the same charge/discharge regime as described in Example 1, this cell produced substantially the same results as described in Example 1.

EXAMPLE 4

For comparison purposes with the electrode made as described in Examples 1 and 2, a pressed nickel electrode was made using "small" nickel flake.

The pressed nickel electrode was made by formulating an electrode mixture having the following composition: 75% $NiO_x$; 8% $CoO_x$; 10% "small" nickel flake; 5% graphite and 2% polytetrafluoroethylene. Prior to incorporating the $NiO_x$ and $CoO_x$ into the electrode mixture, those two components were heated at a temperature of 150° C. for 66 hours. The electrode mixture was utilized to form a pressed nickel electrode as described in Example 1, and the resulting electrode was incorporated into a "dummy" cell also as described in Example 1.

The "dummy" cell was discharged and charged as described in Example 1. A utilization of 74% was obtained. When the same test was made with another pressed nickel electrode made in the same manner as described in this Example, a utilization of 68% was obtained.

Although the total conductive diluent slightly exceeded that employed in Example 1, the utilization achieved with the electrode described in this Example was substantially less than that obtained from the electrode of Example 1. In fact, as will be noted from a comparison of Examples 2 and 4, the electrode of Example 4, although containing approximately 50% more conductive diluent than the corresponding electrode of Example 2, produced a substantially lower utilization than was obtained from a cell incorporating the electrode of Example 2. This difference in result is primarily attributable to the larger size nickel flake utilized in the electrodes of Examples 1 and 2 as compared with the smaller flake of Example 4.

EXAMPLE 5

A second pressed nickel electrode was made as described in Example 4 except that the following electrode mixture was used: 79% $NiO_x$; 9% $CoO_x$; 5"small" nickel flake; 5% graphite and 2% polytetrafluoroethylene. The same discharge/charge regime and the same cell components as described in Example 3 were utilized.

A utilization of 63% was obtained with this electrode. Again, it will be noted that the utilization with this electrode which incorporated small nickel flake was significantly less than that obtained when using pressed nickel electrodes incorporating large nickel flake.

EXAMPLE 6

A series of pressed nickel electrodes was made up having the following compositions: (1) 79% $NiO_x$, 9% $CoO_x$, 5% microcrystalline graphite and 5% "large" Ni flake (total of 10% conductive diluent) and 2% binder; (2) 54% $NiO_x$, 6% $CoO_x$, 28% carbonyl Ni powder and 10% "large" Ni flake (total of 38% conductive diluent), and 2% binder; and (3) 45% $NiO_x$, 5% $CoO_x$, 36% carbonyl Ni powder and 12% "large" Ni flake (total of 48% conductive diluent), and 2% binder.

The aforementioned pressed nickel electrodes were identical in all other respects. The chemically oxidized capacity was first discharged, then the electrodes were charged electrochemically. Upon subsequent discharge, the following utilizations were observed for the first discharge: electrode (1) — 73%; electrode (2) — 40%; and electrode (3) — 61%. The utilization is based on the $NiO_x + CoO_x$ content in the individual electrodes. These data show that the combination of "large" nickel flake plus graphite gives substantially better performing electrodes at lower total conductive diluent levels and at lower nickel flake levels than is achieved in all nickel non-sintered electrodes.

Another series of pressed nickel electrodes was made having the following compositions: (4) 77% $NiO_x$, 8.5% $CoO_x$, 7% microcrystalline graphite and 5% flake graphite (total of 12% conductive diluent) and 2.5% binder; (5) 75.2% $NiO_x$, 8.3% $CoO_x$, 7% microcrystalline graphite and 7% flake graphite (total of 14% conductive diluent and 2.5% binder; and (6) 75.2% $NiO_x$, 8.3% $CoO_x$, 5% microcrystalline graphite and 9% flake graphite (total of 14% conductive diluent), and 2.5% binder.

The flake graphite used in electrode 4–6 had the following description; approximately 0.33–1.7mm (0.013–0.068 in) long (random lengths), 0.55mm (0.022 in) wide, and 0.2mm (0.008 in) thick.

When this second series of electrodes was made an tested in the same manner as previously described, the following utilizations were observed on the discharge following the first electrochemical charge: (4) 61%; (5) 67%; and (6) 59%. Again these utilizations are the percentage of the theoretical capacity that would be expected based upon the $NiO_x + CoO_x$ contained in the individual electrodes.

As will be noted from the foregoing results from electrodes 1–6, the use of the herein-described combination of nickel flake and graphite provides higher % of utilization (at lower total amounts of conductive diluent) than is obtainable from electrodes using only graphite as the conductive diluent.

From the foregoing, it will be understood that there has been described a pressed nickel electrode which includes an apertured current collector, a binder, an active electrode material, and as an improvement, a conductive diluent admixture comprising specific amounts of nickel flake and powdered carbon.

I claim:

1. In a pressed nickel electrode comprising an apertured current collector, and an electrode admixture pressed therein, said electrode admixture comprising an active nickel-containing electrode material, a conductive diluent and a binder, the improvement which comprises:

having as said an conductive diluent admixture homogeneously mixed with said active electrode material and said binder, and consisting essentially of nickel flake and powdered carbon in amounts between about 4% and about 10% by weight and between about 5% and about 10% by weight, respectively, of the total weight of said active electrode material, said conductive diluent admixture, and said binder, said conductive diluent admixture being between about 10% and about 15% by weight of said total weight.

2. The improvement of claim 1 wherein said carbon is a material selected from the group consisting of amorphous carbon and graphite.

3. The improvement of claim 1 wherein said nickel flake is about 1.1–1.5 mm square by about 0.9–1.3 $\mu$m thick and wherein each of said nickel flake and said powdered carbon is present in amounts between about 5% and about 7% of said total weight.

4. The improvement of claim 3 wherein the amount of said powdered carbon is at least equal to the amount of said nickel flake.

5. The improvement of claim 1 wherein said nickel flake has an area defined by sieve sizes $+20\mu m, -44\mu m$ and has a thickness of about 0.5$\mu$m and wherein said nickel flake is present in amounts between about 7% and about 10% by weight of said total weight, said powdered carbon is present in amounts between about 5% and about 8% by weight of said total weight, and the combined weight of said nickel flake and said powdered carbon is between about 12% and about 15% of said total weight.

6. A pressed nickel electrode comprising:
an apertured current collector; and
homogeneous electrode admixture pressed into said apertured current collector and comprising
an active electrode material,
a binder, and
a conductive diluent admixture consisting essentially of nickel flake and powdered carbon in amounts between about 4% and about 10% by weight and between about 5% and about 10% by weight, respectively, of the total weight of said active electrode material, said conductive diluent admixture, and said binder, said conductive diluent admixture being between about 10% and about 15% by weight of said total weight.

7. The electrode of claim 6 wherein said carbon is selected from the group consisting of amorphous carbon and graphite.

8. The electrode of claim 6 wherein said powdered carbon is graphite, said nickel flake is about 1.1–1.5 mm square by about 0.9–1.3$\mu$m thick and wherein each of said nickel flake and said graphite is present in amounts between about 5% and about 7% of said total weight.

9. The electrode of claim 8 wherein the amount of said graphite is at least equal to the amount of said nickel flake.

10. The electrode of claim 6 wherein said powdered carbon is graphite, said nickel flake has an area defined by sieve sizes $+20\mu m, -44\mu m$ and has a thickness of about 0.5$\mu$m, and said nickel flake is present in amounts between about 7% and about 10% by weight of said total weight, said powdered carbon is present in amounts between about 5% and about 8% by weight of said total weight, and the combined weight of said nickel flake and said powdered carbon is between about 12% and about 15% of said total weight.

11. The electrode of claim 6 wherein said binder is present in an amount sufficient to produce a unitary, cohesive electrode.

12. The electrode of claim 11 wherein said binder is present in an amount between about 1.5% and about 10% by weight of said total weight and said active electrode material is present in an amount between about 80% and about 88% by weight of said total weight.

13. The electrode of claim 6 wherein said active electrode is a nickel-containing material selected from the group consisting of nickel hydroxide and the berthollide $NiO_x$ where x is not an integer.

* * * * *